(12) United States Patent
Hoshino et al.

(10) Patent No.: US 11,891,491 B2
(45) Date of Patent: Feb. 6, 2024

(54) WRITING FEEL IMPROVING SHEET WITH WHICH A WRITING FEEL OF WRITING ON PAPER WITH A BALLPOINT PEN IS OBTAINED

(71) Applicant: LINTEC CORPORATION, Tokyo (JP)

(72) Inventors: Hiroki Hoshino, Tokyo (JP); Tomoo Orui, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 57 days.

(21) Appl. No.: 17/312,051

(22) PCT Filed: Dec. 12, 2019

(86) PCT No.: PCT/JP2019/048677
§ 371 (c)(1),
(2) Date: Jun. 9, 2021

(87) PCT Pub. No.: WO2020/122172
PCT Pub. Date: Jun. 18, 2020

(65) Prior Publication Data
US 2022/0033600 A1 Feb. 3, 2022

(30) Foreign Application Priority Data
Dec. 14, 2018 (JP) .................................. 2018-234418

(51) Int. Cl.
*C08J 7/04* (2020.01)
*C09D 7/40* (2018.01)
(Continued)

(52) U.S. Cl.
CPC ............... *C08J 7/042* (2013.01); *C08J 7/043* (2020.01); *C08J 7/046* (2020.01); *C09D 7/61* (2018.01);
(Continued)

(58) Field of Classification Search
CPC ... C08J 7/042; C08J 7/043; C08J 7/046; C08J 2367/02; C08J 2475/16; C08J 7/0427;
(Continued)

(56) References Cited

U.S. PATENT DOCUMENTS

| 5,541,370 A | * | 7/1996 | Matsuda | ............... | C03B 11/086 |
| | | | | | 178/18.05 |
| 2015/0160745 A1 | * | 6/2015 | Hosaka | .................. | G06F 3/0393 |
| | | | | | 428/141 |

(Continued)

FOREIGN PATENT DOCUMENTS

| CN | 108369463 | 8/2018 |
| JP | 8-249103 | 9/1996 |

(Continued)

OTHER PUBLICATIONS

Office Action for corresponding Japanese Patent Application No. 2020-195113, dated Nov. 30, 2021.
(Continued)

*Primary Examiner* — David D Davis
(74) *Attorney, Agent, or Firm* — Greenblum & Bernstein, P.L.C.

(57) ABSTRACT

A writing feel improving sheet comprising a base material and a writing feel improving layer with which a touch pen is brought into contact, wherein when a touch pen having a pen tip of 0.5 mm diameter is used to bring the pen tip into contact with a surface of the writing feel improving layer with which the touch pen is brought into contact and the touch pen is then linearly slid at a speed of 1.6 mm/second while applying a load of 200 g to the touch pen and maintaining an angle formed between the touch pen and the surface at 45°, a difference between a maximum value and a minimum value of frictional force generated between the pen tip and the surface is 80 mN or more and 300 mN or less, wherein the frictional force is measured between a point at
(Continued)

which a sliding distance is 10 mm and a point at which the sliding distance is 100 mm. The writing feel improving sheet makes it possible to well reproduce the writing feel experienced when writing on paper with a ballpoint pen.

22 Claims, 4 Drawing Sheets

(51) Int. Cl.
| | | |
|---|---|---|
| *C09D 7/61* | (2018.01) | |
| *C08J 7/046* | (2020.01) | |
| *C08J 7/043* | (2020.01) | |
| *C09D 175/16* | (2006.01) | |
| *G06F 3/0354* | (2013.01) | |
| *C08L 33/08* | (2006.01) | |
| *C08L 35/02* | (2006.01) | |
| *G06F 3/041* | (2006.01) | |

(52) U.S. Cl.
CPC ............... *C09D 7/69* (2018.01); *C09D 7/70* (2018.01); *C09D 175/16* (2013.01); *G06F 3/03545* (2013.01); *C08J 2367/02* (2013.01); *C08J 2475/16* (2013.01); *C08L 33/08* (2013.01); *C08L 35/02* (2013.01); *G06F 3/041* (2013.01)

(58) Field of Classification Search
CPC ... C09D 7/61; C09D 7/69; C09D 7/70; C09D 175/16; G06F 3/03545; G06F 3/041; G06F 3/0393; C08L 33/08; C08L 35/02; B32B 27/00
See application file for complete search history.

(56) References Cited

U.S. PATENT DOCUMENTS

| | | |
|---|---|---|
| 2015/0291828 A1 | 10/2015 | Yokoyama et al. |
| 2016/0236975 A1* | 8/2016 | Sugimoto ............... C03C 15/00 |
| 2016/0328050 A1 | 11/2016 | Shimosugi |
| 2017/0038842 A1* | 2/2017 | Yairi ..................... G06F 3/0393 |
| 2018/0348898 A1* | 12/2018 | Kato ....................... B32B 27/30 |
| 2018/0364822 A1 | 12/2018 | Taya et al. |

FOREIGN PATENT DOCUMENTS

| | | | | |
|---|---|---|---|---|
| JP | 2014-97649 | 5/2014 | | |
| JP | 2015-98123 | 5/2015 | | |
| JP | 2015-194921 | 11/2015 | | |
| JP | 2018-5853 | 1/2018 | | |
| JP | 2018-81482 | 5/2018 | | |
| JP | 2018-81483 | 5/2018 | | |
| JP | 2018-81484 | 5/2018 | | |
| JP | 2018081483 A * | 5/2018 | ............ | B32B 7/022 |
| JP | 2018-97670 | 6/2018 | | |
| JP | 2018-129045 | 8/2018 | | |
| JP | 2018-173906 | 11/2018 | | |
| JP | 6801147 | 12/2020 | | |
| WO | 2020/122172 | 6/2020 | | |

OTHER PUBLICATIONS

Official Communication issued in International Bureau of WIPO Patent Application No. PCT/JP2019/048677, dated Mar. 17, 2020.
Office Action issued in Corresponding CN Appl. No. 201980042001, dated Mar. 30, 2022.
Office Action Issued in Corresponding CN Patent Application No. 2019800420013, dated Feb. 22, 2023, along with an English translation thereof.

* cited by examiner

[FIG. 1]
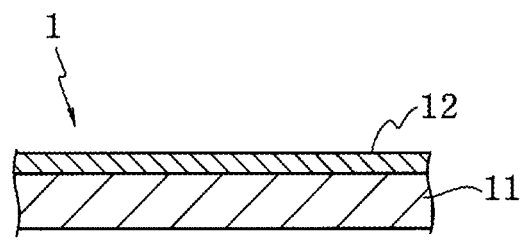

[FIG. 2]
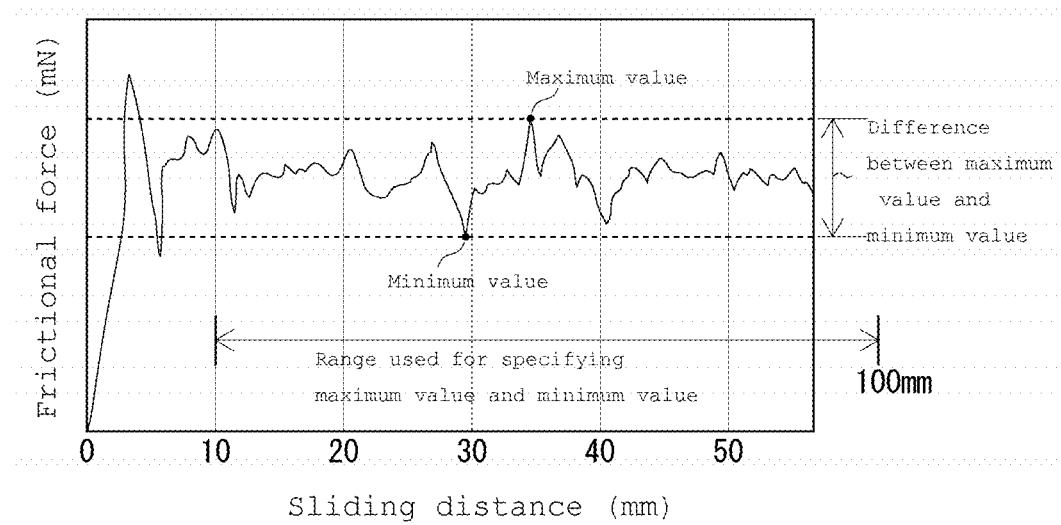

[FIG. 3]
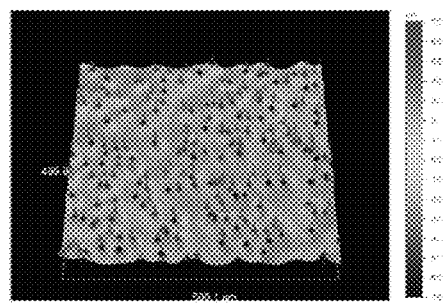

[FIG. 4]
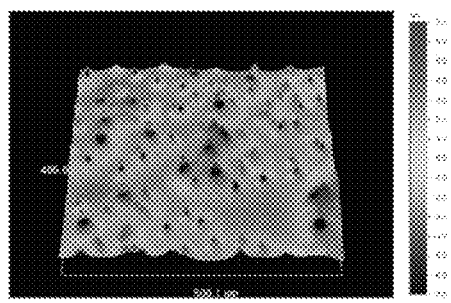

WRITING FEEL IMPROVING SHEET WITH WHICH A WRITING FEEL OF WRITING ON PAPER WITH A BALLPOINT PEN IS OBTAINED

TECHNICAL FIELD

The present invention relates to a writing feel improving sheet with which the writing feel on a touch panel or the like with a touch pen can be improved.

BACKGROUND ART

In recent years, image display devices (touch panels) having a position detection function and serving both as a display device and as an input means are widely used in various electronic devices. Such touch panels include those in which the input operation is performed by a finger as well as those in which the input operation is performed using a touch pen. The touch pen allows the input operation to be performed with a higher degree of accuracy than by a finger. Usually, however, display modules of touch panels are rigid. The writing feel with a touch pen is therefore different from the writing feel experienced when writing on paper with a pen or pencil and cannot be said to be good.

To solve the problem of writing feel with a touch pen on a touch panel, it has been considered to attach a film for improving the writing feel (which may be referred to as a "writing feel improving film" or a "writing feel improving sheet," hereinafter) to the outermost surface of the touch panel. For example, Patent Document 1 discloses a film with which it is attempted to reproduce the writing feel experienced when writing on paper with a ballpoint pen. Specifically, Patent Document 1 discloses a transparent laminated film that includes a transparent base material layer and a surface smooth layer laminated on one surface of the transparent base material layer. The surface smooth layer is formed of a cured product of a curable composition that contains a curable resin and a leveling agent. The curable resin contains urethane (meth)acrylate. The static friction coefficient of the surface smooth layer is 0.2 to 0.4 and the dynamic friction coefficient is 0.1 to 0.3. The difference between the static friction coefficient and the dynamic friction coefficient (Static friction coefficient—Dynamic friction coefficient) is more than 0.05.

PRIOR ART DOCUMENTS

Patent Documents

[Patent Document 1] JP2015-194921A

SUMMARY OF THE INVENTION

Problems to be Solved by the Invention

According to the invention disclosed in Patent Document 1, however, the writing feel when writing on paper with a ballpoint pen was not sufficiently obtained. Thus, there has been a demand for the development of a writing feel improving sheet with which the writing feel when writing on paper with a ballpoint pen is better reproduced.

The present invention has been made in consideration of such actual circumstances and an object of the present invention is to provide a writing feel improving sheet with which the writing feel when writing on paper with a ballpoint pen can be well reproduced.

Means for Solving the Problems

To achieve the above object, first, the present invention provides a writing feel improving sheet comprising a base material and a writing feel improving layer with which a touch pen is brought into contact, wherein when a touch pen having a pen tip of 0.5 mm diameter is used to bring the pen tip into contact with a surface of the writing feel improving layer with which the touch pen is brought into contact and the touch pen is then linearly slid at a speed of 1.6 mm/second while applying a load of 200 g to the touch pen and maintaining an angle formed between the touch pen and the surface at 45°, a difference between a maximum value and a minimum value of frictional force generated between the pen tip and the surface is 80 mN or more and 300 mN or less, wherein the frictional force is measured between a point at which a sliding distance is 10 mm and a point at which the sliding distance is 100 mm (Invention 1).

In the writing feel improving sheet according to the above invention (Invention 1), the difference between the maximum value and the minimum value of frictional force measured as described above falls within the above range, and the feeling of vibration when writing on paper with a ballpoint pen can thereby be well reproduced. This makes it possible to well reproduce the writing feel experienced when writing on paper with a ballpoint pen.

Second, the present invention provides a writing feel improving sheet comprising a base material and a writing feel improving layer with which a touch pen is brought into contact, wherein when a touch pen having a pen tip of 0.5 mm diameter is used to bring the pen tip into contact with a surface of the writing feel improving layer with which the touch pen is brought into contact and the touch pen is then linearly slid at a speed of 1.6 mm/second while applying a load of 200 g to the touch pen and maintaining an angle formed between the touch pen and the surface at 45°, a standard deviation of frictional force generated between the pen tip and the surface is 15 mN or more and 60 mN or less, wherein the frictional force is measured between a point at which a sliding distance is 10 mm and a point at which the sliding distance is 20 mm (Invention 2).

In the writing feel improving sheet according to the above invention (Invention 2), the standard deviation of frictional force measured as described above falls within the above range, and the feeling of vibration when writing on paper with a ballpoint pen can thereby be well reproduced. This makes it possible to well reproduce the writing feel experienced when writing on paper with a ballpoint pen.

In the above invention (Invention 1 or 2), an average value of the frictional force generated between the touch pen and the surface may be preferably 200 mN or more and 1200 mN or less, wherein the frictional force is measured between a point at which the sliding distance is 10 mm and a point at which the sliding distance is 100 mm (Invention 3).

In the above invention (Invention 1 to 3), the writing feel improving sheet may preferably comprise an adhesive layer provided on a surface side of the base material opposite to the writing feel improving layer (Invention 4).

In the above invention (Invention 1 to 4), a haze value of the writing feel improving sheet may be preferably 25% or more (Invention 5).

Advantageous Effect of the Invention

The writing feel improving sheet according to the present invention makes it possible to well reproduce the writing feel experienced when writing on paper with a ballpoint pen.

BRIEF DESCRIPTION OF DRAWINGS

FIG. 1 is a cross-sectional view of a writing feel improving sheet according to an embodiment of the present invention.

FIG. 2 is a graph illustrating an example of a measurement result of frictional force.

FIG. 3 is an observation image of the surface of a writing feel improving layer of a writing feel improving film in Example 4 when observed using an optical interference-type surface profile observation device (VSI mode).

FIG. 4 is an observation image of the surface of a writing feel improving layer of a writing feel improving film in Example 14 when observed using an optical interference-type surface profile observation device (VSI mode).

EMBODIMENTS FOR CARRYING OUT THE INVENTION

Hereinafter, one or more embodiments of the present invention will be described.

The writing feel improving sheet according to the present embodiment is a sheet that constitutes the outermost layer of a touch panel on which a touch pen is used, and includes a base material and a writing feel improving layer with which a touch pen is brought into contact. As illustrated in FIG. 1, a writing feel improving sheet 1 according to the present embodiment may be preferably formed by laminating a base material 11 and a writing feel improving layer 12 on each other.

1. Physical Properties of Writing Feel Improving Sheet (1) Difference between Maximum Value and Minimum Value of Frictional Force In the writing feel improving sheet 1 according to the present embodiment, when a touch pen having a pen tip of 0.5 mm diameter is used to bring the pen tip into contact with a surface of the writing feel improving layer 12 with which the touch pen is brought into contact and the above touch pen is then linearly slid at a speed of 1.6 mm/second while applying a load of 200 g to the above touch pen and maintaining an angle formed between the above touch pen and the above surface at 45°, the difference between the maximum value and the minimum value of frictional force generated between the above pen tip and the above surface is preferably 80 mN or more, more preferably 90 mN or more, particularly preferably 100 mN or more, and further preferably 110 mN or more. The frictional force is measured between a point at which a sliding distance is 10 mm and a point at which the sliding distance is 100 mm. From another aspect, the above-described difference is preferably 300 mN or less, more preferably 280 mN or less, particularly preferably 260 mN or less, and further preferably 240 mN or less.

Here, the frictional force measured as described above will be described in more detail with reference to FIG. 2. FIG. 2 illustrates the result of continuously measuring the frictional force generated between the pen tip of a touch pen and the surface of a commonly-used writing feel improving sheet when the touch pen is slid on the surface. In the graph illustrated in FIG. 2, the horizontal axis represents the sliding distance of the touch pen, and the vertical axis represents the measured frictional force. As illustrated in the graph, in general, the measured value of frictional force is not always a constant value and fluctuates in accordance with the sliding distance. In the graph of FIG. 2, at the beginning of movement (e.g., between a sliding distance of 0 mm and a sliding distance of 10 mm), the frictional force rapidly increases from 0 mN and decreases immediately after that. Thereafter (e.g., after a sliding distance of 10 mm), the frictional force stabilizes near a certain value while slightly fluctuating.

In the measurement result of frictional force exhibiting such characteristics, the maximum value and the minimum value of frictional force on the writing feel improving sheet 1 of the present embodiment may be specified to obtain the difference between them after the position of a sliding distance of 10 mm where the stabilization of frictional force is observed. It can also be said that the difference represents the width (amplitude) of the fluctuation of frictional force in the state in which the frictional force stabilizes. In the writing feel improving sheet 1 of the present embodiment, the measurement result up to a sliding distance of 100 mm may be used from the viewpoint of improving the accuracy of the obtained difference.

In the writing feel improving sheet 1 of the present embodiment, the difference between the maximum value and the minimum value of frictional force falls within the above-described range; therefore, upon the use of a touch pen on a touch panel to which the writing feel improving sheet 1 is attached, the feeling of vibration transmitted to the hand holding the touch pen is very close to the feeling of vibration obtained when writing on paper with a ballpoint pen. This makes it possible to well reproduce the writing feel experienced when writing on paper with a ballpoint pen.

The maximum value of the above-described frictional force may be preferably 300 mN or more, particularly preferably 400 mN or more, and further preferably 450 mN or more. From another aspect the maximum value of the above-described frictional force may be preferably 1500 mN or less, more preferably 1200 mN or less, particularly preferably 1000 mN or less, and further preferably 800 mN or less.

On the other hand, the minimum value of the above-described frictional force may be preferably 180 mN or more, particularly preferably 250 mN or more, and further preferably 300 mN or more. From another aspect, the minimum value of the above-described frictional force may be preferably 1000 mN or less, particularly preferably 800 mN or less, and further preferably 650 mN or less.

When the maximum value and minimum value of the above-described frictional force fall within the above-described respective ranges, the difference between the maximum value and the minimum value of frictional force can be readily adjusted to the previously described range.

The average value of the above-described frictional force may be preferably 200 mN or more, more preferably 250 mN or more, particularly preferably 300 mN or more, and further preferably 380 mN or more as the lower limit. The lower limit of the average value within the above-described range allows the difference between the maximum value and the minimum value of frictional force to be readily adjusted within the above-described range; therefore, upon the use of a touch pen on a touch panel to which the writing feel improving sheet 1 is attached, the feeling of vibration transmitted to the hand holding the touch pen can be readily reproduced as the feeling of vibration obtained when writing on paper with a ballpoint pen. From the viewpoint that the difference between the maximum value and the minimum value of frictional force can be readily adjusted within the above-described range, the average value of the above-described frictional force may be preferably 1200 mN or less, more preferably 1150 mN or less, and particularly preferably 1050 mN or less as the upper limit. From the viewpoint that the dynamic friction coefficient, which will be described later, can be readily adjusted within a predetermined range, the average value of the above-described frictional force may be particularly preferably 950 mN or less and further preferably 700 mN or less as the upper limit.

Details of the methods of measuring the difference between the maximum value and the minimum value of frictional force, the maximum value, the minimum value, and the average value of frictional force described above are as described in the testing example, which will be described later.

(2) Standard Deviation of Frictional Force

In the writing feel improving sheet 1 according to the present embodiment, when a touch pen having a pen tip of 0.5 mm diameter is used to bring the pen tip into contact with a surface of the writing feel improving layer 12 with which the touch pen is brought into contact and the above touch pen is then linearly slid at a speed of 1.6 mm/second while applying a load of 200 g to the above touch pen and maintaining an angle formed between the above touch pen and the above surface at 45°, the standard deviation of frictional force generated between the above pen tip and the above surface is preferably 15 mN or more, more preferably 18 mN or more, particularly preferably 21 mN or more, and further preferably 24 mN or more. The frictional force is measured between a point at which a sliding distance is 10 mm and a point at which the sliding distance is 20 mm. From another aspect, the above difference is preferably 60 mN or less, more preferably 54 mN or less, particularly preferably 48 mN or less, further preferably 42 mN or less, and most preferably 40 mN or less.

The above-described standard deviation is also to be obtained using the measurement result after the position of a sliding distance of 10 mm where the stabilization of frictional force is observed in the sequence of frictional force measured as illustrated in the graph of FIG. 2. When specifying the above-described standard deviation, the measurement result up to a sliding distance of 20 mm is used.

In the writing feel improving sheet 1 of the present embodiment, the standard deviation of frictional force falls within the above-described range; therefore, upon the use of a touch pen on a touch panel to which the writing feel improving sheet 1 is attached, the feeling of vibration transmitted to the hand holding the touch pen is very close to the feeling of vibration obtained when writing on paper with a ballpoint pen. This makes it possible to well reproduce the writing feel experienced when writing on paper with a ballpoint pen. Details of the method of measuring the above-described standard deviation are as described in the testing example, which will be described later.

(3) Dynamic Friction Coefficient

In the writing feel improving sheet 1 according to the present embodiment, when a touch pen having a pen tip of 0.5 mm diameter is used to bring the pen tip into contact with a surface of the writing feel improving layer 12 with which the touch pen is brought into contact and the above touch pen is then linearly slid at a speed of 1.6 mm/second while applying a load of 200 g to the above touch pen and maintaining an angle formed between the above touch pen and the above surface at 45°, the dynamic friction coefficient may be preferably 0.11 or more, particularly preferably 0.14 or more, and further preferably 0.20 or more. From another aspect, the above-described dynamic friction coefficient may be preferably 0.62 or less, more preferably 0.52 or less, particularly preferably 0.42 or less, and further preferably 0.32 or less.

In the writing feel improving sheet 1 according to the present embodiment, when a touch pen having a pen tip of 0.5 mm diameter is used to bring the pen tip into contact with a surface of the writing feel improving layer 12 with which the touch pen is brought into contact and the above touch pen is then linearly slid at a speed of 16.7 mm/second while applying a load of 200 g to the above touch pen and maintaining an angle formed between the above touch pen and the above surface at 45°, the dynamic friction coefficient may be preferably 0.11 or more, particularly preferably 0.16 or more, and further preferably 0.21 or more. From another aspect, the above-described dynamic friction coefficient may be preferably 0.64 or less, more preferably 0.54 or less, particularly preferably 0.44 or less, and further preferably 0.34 or less. Note that the above-described speed of 16.7 mm/second is close to a speed at which a person actually writes characters using a pen.

When the dynamic friction coefficient falls within the above-described range, upon the use of a touch pen on a touch panel to which the writing feel improving sheet 1 is attached, the feeling of resistance transmitted to the hand holding the touch pen is very close to the feeling of resistance obtained upon the writing on paper with a ballpoint pen. This makes it possible to better reproduce the writing feel experienced when writing on paper with a ballpoint pen. Details of the method of measuring the above-described dynamic friction coefficient are as described in the testing example, which will be described later.

In general, the dynamic friction coefficient is uniquely determined by the combination of substances in contact with each other, but this is considered to be notably applicable to a case in which the conditions such as surface conditions of the substances are ideal. On the other hand, in an actual writing feel improving sheet such as the writing feel improving sheet 1 according to the present embodiment, the dynamic friction coefficient when sliding a touch pen on the sheet tends to vary in accordance with the sliding speed and the like. One of the reasons for this may be that there are microscopic irregularities on the surface of a writing feel improving film. When a touch pen is slid on a surface having such irregularities, the touch pen slides while the pen tip of the touch pen collides with the irregularities. Here, from a microscopic point of view, it is expected that as the sliding speed increases, the force when the pen tip collides increases, and some changes may occur such that the measured frictional force and dynamic friction coefficient increase accordingly.

Another reason may be that the softness of the sheet surface and the softness of the pen tip affect the changes in the measured frictional force and dynamic friction coefficient. For example, when sliding a relatively soft pen tip on a relatively soft sheet surface, it is expected that as the sliding speed increases, the pen tip is more likely to get caught on the sheet surface, thereby causing changes in the measured frictional force and dynamic friction coefficient. It is considered that such changes due to the softness of the substances in contact with each other occur independently of the changes due to the presence or absence of irregularities on the sheet surface as described above.

The reasons as described above are not limited to these, and may be due to a completely different reason.

(4) Surface Roughness

In the writing feel improving sheet 1 according to the present embodiment, the arithmetic average surface roughness (Ra) on the surface on the writing feel improving layer side may be preferably 0.05 µm or more, particularly preferably 0.12 µm or more, and further preferably 0.16 µm or more. From another aspect, the arithmetic average surface roughness (Ra) may be preferably 0.95 µm or less, more preferably 0.85 µm or less, particularly preferably 0.75 µm or less, and further preferably 0.55 µm or less. When the arithmetic average surface roughness (Ra) falls within the above range, the difference between the maximum value and the minimum value of frictional force, the standard deviation of frictional force, and the dynamic friction coefficient of frictional force can be readily adjusted within the previously described respective ranges.

Additionally or alternatively, in the writing feel improving sheet 1 according to the present embodiment, the ten-point average surface roughness (Rzjis) on the surface on the writing feel improving layer side may be preferably 0.8 µm or more, particularly preferably 1.5 µm or more, and further preferably 2.2 µm or more. From another aspect, the ten-point average surface roughness (Rzjis) may be preferably 8 µm or less, more preferably 7 µm or less, particularly preferably 6 µm or less, and further preferably 5 µm or less. When the ten-point average surface roughness (Rzjis) falls within the above range, the difference between the maximum value and the minimum value of frictional force, the standard deviation of frictional force, and the dynamic friction coefficient of frictional force can be readily adjusted within the previously described respective ranges.

The above-described average surface roughness (Ra) and ten-point average surface roughness (Rzjis) are measured in accordance with JIS B0601: 2013, and details of these measurement methods are described in the testing example, which will be described later.

(5) Optical Properties

The haze value of the writing feel improving sheet 1 according to the present embodiment is not particularly limited and may be preferably 0.5% or more and more preferably 1% or more, but from the viewpoint that the occurrence of a phenomenon that the screen image light from a touch panel is scattered and that portion is glaring (this phenomenon may be referred to as "glare," hereinafter) can be effectively suppressed in a tablet terminal or the like in which the writing feel improving sheet 1 is used, the haze value may be particularly preferably 25% or more and further preferably 50% or more. From another aspect, the above haze value may be preferably 95% or less, particularly preferably 90% or less, and further preferably 85% or less. When the above haze value is 95% or less, the writing feel improving sheet 1 according to the present embodiment has higher transparency. The above haze value is measured in accordance with JIS K7136: 2000, and the detailed measuring method is as described in the testing example, which will be described later.

The total luminous transmittance of the writing feel improving sheet 1 according to the present embodiment may be preferably 70% or more, particularly preferably 80% or more, and further preferably 88% or more. When the above total luminous transmittance is 70% or more, the writing feel improving sheet 1 according to the present embodiment has higher transparency. On the other hand, the upper limit of the above total luminous transmittance is not particularly limited and may be, for example, preferably 100% or less, particularly preferably 96% or less, and further preferably 92% or less. The above total luminous transmittance is measured in accordance with JIS K7361-1: 1997, and the detailed measuring method is as described in the testing example, which will be described later.

(6) Scratch Resistance

On the surface of the writing feel improving sheet 1 according to the present embodiment on the writing feel improving layer 12 side, when the writing feel improving layer 12 is rubbed at a load of 250 g/cm$^2$ using #0000 steel wool to reciprocate it ten times within a length of 10 cm, it is preferred that no scratches be generated. When having the scratch resistance based on such evaluation of the hardness against steel wool, the writing feel improving layer 12 can exhibit good hard coat properties, and the writing feel improving sheet 1 is excellent in the scratch resistance.

(7) Surface Profile

When the surface profile of the surface of the writing feel improving sheet 1 according to the present embodiment on the writing feel improving layer 12 side is observed using an optical interference-type surface profile observation device, the ratio of flat portions that are regions in which the height is 1.0 µm or less may be preferably 40% or less, more preferably 30% or less, particularly preferably 20% or less, further preferably 15% or less, and most preferably 10% or less. When the ratio of the flat portions is 40% or less, the difference between the maximum value and the minimum value of frictional force or the standard deviation of frictional force can be readily adjusted within the previously described corresponding range. In particular, when the ratio of the flat portions is 20% or less, the surface of the writing feel improving sheet 1 on the writing feel improving layer 12 side can readily have a surface with a uniform irregular structure as illustrated in FIG. 3. According to such a feature, in combination with satisfying the previously described condition for the difference between the maximum value and the minimum value of frictional force or the standard deviation of frictional force, the writing feel when writing on paper with a ballpoint pen can be better reproduced. Moreover, when a touch pen is slid on the surface having a uniform irregular structure as illustrated in FIG. 3, the pen tip of the touch pen can be readily slid while moderately colliding with the irregularities at regular intervals. Accordingly, the force applied to the pen tip when the pen tip collides with the irregular structure is constant and moderate, and the load on the pen tip is less likely to be applied; therefore, the wear of the pen tip of the touch pen can be readily reduced. Furthermore, the writing feel improving sheet 1 can have a good appearance. The lower limit of the above ratio of the flat portions is not particularly limited, but may be preferably 1% or more, particularly preferably 3% or more, and further preferably 5% or more, for example, from the viewpoint that the difference between the maximum value and the minimum value of frictional force, the standard deviation of frictional force, and the dynamic friction coefficient of frictional force can be readily adjusted within the previously described respective ranges. Details of the method of measuring the above ratio of the flat portions are as described in the testing example, which will be described later.

When the surface profile of the surface of the writing feel improving sheet 1 according to the present embodiment on the writing feel improving layer 12 side is observed using an optical interference-type surface profile observation device, the radius of an inscribed circle having the maximum radius (the maximum radius of the inscribed circle in a flat portion) among inscribed circles that can be assumed as the above-described flat portions may be preferably 100 µm or less, more preferably 80 µm or less, particularly preferably 60 µm or less, further preferably 50 µm or less, and most preferably 40 µm or less. When the maximum radius of the inscribed circle in the flat portion is 100 µm or less, the difference between the maximum value and the minimum value of frictional force or the standard deviation of frictional force can be readily adjusted within the previously described corresponding range. In particular, when the maximum radius of the inscribed circle in the flat portion is 60 µm or less, the surface of the writing feel improving sheet 1 on the writing feel improving layer 12 side can readily have a surface with a uniform irregular structure as illustrated in FIG. 3. According to such a feature, in combination with satisfying the previously described condition for the difference between the maximum value and the minimum value of frictional force or the standard deviation of frictional force, the writing feel when writing on paper with a ballpoint pen can be better reproduced. Moreover, the wear of the pen tip of a touch pen can be readily reduced, and the writing feel improving sheet 1 can have a good appearance. The lower limit of the above maximum radius of the inscribed circle in the flat portion is not particularly limited, but may be preferably 10 µm or more, particularly preferably 20 µm or more, and further preferably 30 µm or more, for example, from the viewpoint that the difference between the maximum value and the minimum value of frictional force, the standard deviation of frictional force, and the dynamic friction coefficient of frictional force can be readily adjusted within the previously described respective ranges. Details of the method of measuring the above maximum radius of the inscribed circle in the flat portion are as described in the testing example, which will be described later.

When the surface profile of the surface of the writing feel improving sheet 1 according to the present embodiment on the writing feel improving layer 12 side is observed using an optical interference-type surface profile observation device, the number of projections having a height of more than 1 µm and 5 µm or less may be preferably 300 or less, more preferably 240 or less, particularly preferably 180 or less, further preferably 120 or less, and most preferably 100 or less. When the number of the above-described projections is 300 or less, the difference between the maximum value and the minimum value of frictional force or the standard deviation of frictional force can be readily adjusted within the previously described corresponding range. In particular, when the number of the above-described projections is 180 or less, the surface of the writing feel improving sheet 1 on the writing feel improving layer 12 side can readily have a surface with a uniform irregular structure as illustrated in FIG. 3. According to such a feature, in combination with satisfying the previously described condition for the difference between the maximum value and the minimum value of frictional force or the standard deviation of frictional force, the writing feel when writing on paper with a ballpoint pen can be better reproduced. Moreover, the wear of the pen tip of a touch pen can be readily reduced, and the writing feel improving sheet 1 can have a good appearance. The lower limit of the number of the above-described projections is not particularly limited, but may be preferably 10 or more, particularly preferably 40 or more, and further preferably 80 or more, for example, from the viewpoint that the difference between the maximum value and the minimum value of frictional force, the standard deviation of frictional force, and the dynamic friction coefficient of frictional force can be readily adjusted within the previously described respective ranges. Details of the method of measuring the number of the above-described projections are as described in the testing example, which will be described later.

When the surface profile of the surface of the writing feel improving sheet 1 according to the present embodiment on the writing feel improving layer 12 side is observed using an optical interference-type surface profile observation device, the number of projections having a height of more than 5 µm may be preferably 30 or less and more preferably 20 or less from the viewpoint that the difference between the maximum value and the minimum value of frictional force or the standard deviation of frictional force can be readily adjusted within the previously described corresponding range. From the viewpoint that the surface of the writing feel improving sheet 1 on the writing feel improving layer 12 side can readily have a surface with a uniform irregular structure as illustrated in FIG. 3, the number of projections having a height of more than 5 µm may be preferably 15 or less, more preferably 10 or less, particularly preferably 5 or less, further preferably 2 or less, and most preferably 0. According to such a feature, in combination with satisfying the previously described condition for the difference between the maximum value and the minimum value of frictional force or the standard deviation of frictional force, the writing feel when writing on paper with a ballpoint pen can be better reproduced. Moreover, the wear of the pen tip of a touch pen can be readily reduced, and the writing feel improving sheet 1 can have a good appearance. Details of the method of measuring the number of the above-described projections are as described in the testing example, which will be described later.

2. Members of Writing Feel Improving Sheet (1) Base Material

The base material 11 may be appropriately selected from those suitable for a touch panel on which a touch pen is used, and it may be preferred to select a plastic film having a good affinity with the writing feel improving layer 12. Note, however, that the base material 11 may be glass.

Examples of such a plastic film include films of polyesters such as polyethylene terephthalate, polybutylene terephthalate, and polyethylene naphthalate, polyolefin films such as a polyethylene film and a polypropylene film, cellophane, a diacetyl cellulose film, a triacetyl cellulose film, an acetyl cellulose butyrate film, a polyvinyl chloride film, a polyvinylidene chloride film, a polyvinyl alcohol film, an ethylene-vinyl acetate copolymer film, a polystyrene film, a polycarbonate film, a polymethylpentene film, a polysulfone film, a polyether ether ketone film, a polyether sulfone film, a polyether imide film, a fluorine resin film, a polyamide film, an acrylic resin film, a polyurethane resin film, a norbornene-based polymer film, a cyclic olefin-based polymer film, a cyclic conjugated diene-based polymer film, a vinyl alicyclic hydrocarbon polymer film, other appropriate plastic films, and laminated films thereof. Among these, the polyethylene terephthalate film, polycarbonate film, norbornene-based polymer film, and the like may be preferred because they can well maintain the writing feel with a touch pen in combination with the previously described writing feel improving layer 12, and the polyethylene terephthalate film may be particularly preferred.

For the purpose of improving the interfacial adhesion between the above base material 11 and a layer provided on the surface of the base material 11 (such as the writing feel improving layer 12 or an adhesive layer to be described later), if desired, one surface or both surfaces of the base material 11 can be subjected to surface treatment, such as by primer treatment, an oxidation method, or a roughening method. Examples of the oxidation method include corona discharge treatment, chromic acid treatment, flame treatment, hot-air treatment, and ozone/ultraviolet treatment.

Examples of the roughening method include a sandblast method and a solvent treatment method. Any of these surface treatment methods may be appropriately selected in accordance with the type of the base material 11. As an example, it may be preferred to use a plastic film, in particular a polyethylene terephthalate film, on which an easy-adhesion layer is formed by the primer treatment.

The thickness of the base material 11 may be preferably 15 μm or more, particularly preferably 30 μm or more, and further preferably 90 μm or more. From another aspect, the thickness of the base material 11 may be preferably 300 μm or less, particularly preferably 200 μm or less, and further preferably 150 μm or less.

(2) Writing Feel Improving Layer

The material for forming the writing feel improving layer 12 in the present embodiment is not particularly limited, provided that it can achieve the previously described difference between the maximum value and the minimum value of frictional force or the previously described standard deviation of frictional force. Preferably, the writing feel improving layer 12 may be formed by curing a coating composition, which will be described below. According to such a coating composition, the difference between the maximum value and the minimum value of frictional force or the standard deviation of frictional force can be readily adjusted within the previously described corresponding range.

The coating composition in the present embodiment may preferably contain a curable component, fine particles, a surface conditioner, and silica nanoparticles.

(2-1) Curable Component

The curable component may be a component that is cured by a trigger such as active energy rays or heat, and examples of the curable component include an active energy ray-curable component and a thermosetting component. In the present embodiment, it may be preferred to use the active energy ray-curable component from the viewpoint of the hardness of the writing feel improving layer 12 formed, the heat resistance of the base material 11 (plastic film), and the like.

The active energy ray-curable component may preferably be a component that can be cured by irradiation with active energy rays to exhibit predetermined hardness and achieve the previously described physical properties.

Specific examples of the active energy ray-curable component include polyfunctional (meth)acrylate-based monomer, (meth)acrylate-based prepolymer, and active energy ray-curable polymer, among which the polyfunctional (meth)acrylate-based monomer and/or (meth)acrylate-based prepolymer may be preferred and the polyfunctional (meth)acrylate-based monomer may be more preferred. The polyfunctional (meth)acrylate-based monomer and the (meth)acrylate-based prepolymer may each be used alone or both may also be used in combination. As used in the present specification, the (meth)acrylate refers to both an acrylate and a methacrylate. The same applies to other similar terms.

Examples of the polyfunctional (meth)acrylate-based monomer include 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylol propane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, pentaerythritol tetra(meth)acrylate, propionic acid-modified dipentaerythritol penta(meth)acrylate, dipentaerythritol hexa(meth)acrylate, ethylene oxide-modified dipentaerythritol hexa(meth)acrylate, caprolactone-modified dipentaerythritol hexa(meth)acrylate, and other appropriate polyfunctional (meth)acrylates. These may each be used alone or two or more types may also be used in combination.

On the other hand, examples of the (meth)acrylate-based prepolymer include polyester acrylate-based, epoxy acrylate-based, urethane acrylate-based, and polyol acrylate-based prepolymers.

The polyester acrylate-based prepolymer can be obtained, for example, through preparing a polyester oligomer having hydroxyl groups at both ends obtained by condensation of a polycarboxylic acid and a polyalcohol and esterifying the hydroxyl groups of the polyester oligomer with (meth)acrylic acid, or through preparing an oligomer obtained by adding an alkylene oxide to a polycarboxylic acid and esterifying the hydroxyl group at an end of the oligomer with (meth)acrylic acid.

The epoxy acrylate-based prepolymer can be obtained, for example, through reacting (meth)acrylic acid with the oxirane ring of a relatively low-molecular-weight bisphenol-type epoxy resin or novolak-type epoxy resin to esterify it.

The urethane acrylate-based prepolymer can be obtained, for example, through preparing a polyurethane oligomer obtained by a reaction between a polyether polyol or a polyester polyol and a polyisocyanate and esterifying the polyurethane oligomer with (meth)acrylic acid.

The polyol acrylate-based prepolymer can be obtained, for example, through esterifying a hydroxyl group of a polyether polyol with (meth)acrylic acid.

The above prepolymers may each be used alone or two or more types may also be used in combination.

(2-2) Fine Particles

When the coating composition contains fine particles, the surface of the writing feel improving layer 12 formed can be a moderately rough surface, and as a result, the difference between the maximum value and the minimum value of frictional force or the standard deviation of frictional force can be readily adjusted within the previously described corresponding range. This allows the moderate feeling of vibration to be developed when writing on the writing feel improving layer 12 with a touch pen, and the writing feel improving sheet 1 makes it possible to well reproduce the writing feel experienced when writing on paper with a ballpoint pen.

The above fine particles refer to those having a larger average particle diameter than that of silica nanoparticles, which will be described later. For example, the average particle diameter of the above fine particles may be preferably 1 μm or more, particularly preferably 2 μm or more, and further preferably 3 μm or more. From another aspect, the average particle diameter of the above fine particles may be preferably 20 μm or less, particularly preferably 16 μm or less, and further preferably 12 μm or less. When the average particle diameter of the above fine particles falls within the above range, the difference between the maximum value and the minimum value of frictional force or the standard deviation of frictional force can be readily adjusted within the previously described corresponding range. Furthermore, the dynamic friction coefficient of frictional force can be readily adjusted within the previously described range, and the moderate feeling of friction can be given with the writing feel improving layer 12; therefore, owing to the synergistic effect with the previously described feeling of vibration, the writing feel improving sheet 1 makes it possible to better reproduce the writing feel experienced when writing on paper with a ballpoint pen.

The coefficient of variation (CV value) of the particle diameter of the above fine particles represented by the following equation may be preferably 3% or more and particularly preferably 8% or more. From another aspect, the coefficient of variation (CV value) of the particle diameter may be preferably 70% or less, particularly preferably 45% or less, and further preferably 25% or less.

Coefficient of variation (CV value) of particle diameter=(Standard deviation particle diameter/Average particle diameter)×100

When the CV value of the above fine particles falls within the above range, the difference between the maximum value and the minimum value of frictional force or the standard deviation of frictional force can be readily adjusted within the previously described corresponding range. Furthermore, the dynamic friction coefficient of frictional force can be readily adjusted within the previously described range, and the moderate feeling of friction can be given with the writing feel improving layer 12; therefore, owing to the synergistic effect with the previously described feeling of vibration, the writing feel improving sheet 1 makes it possible to better reproduce the writing feel experienced when writing on paper with a ballpoint pen.

The above-described average particle diameter and coefficient of variation (CV value) of the fine particles refer to values measured with a laser diffraction and scattering-type particle diameter distribution measurement device using a few drops of a dispersion liquid as a sample. The dispersion liquid may be prepared with methyl ethyl ketone as a dispersion medium and may have a concentration of 5 mass %.

The above fine particles may be inorganic fine particles, organic fine particles, or resin fine particles having both inorganic and organic properties, but from the viewpoint of the hardness of the writing feel improving layer 12 formed, the inorganic fine particles or the resin fine particles having both inorganic and organic properties may be preferred, and from the viewpoint of readily adjusting the difference between the maximum value and the minimum value of frictional force or the standard deviation of frictional force within the previously described corresponding range, the resin fine particles having both inorganic and organic properties may be particularly preferred. Examples of the inorganic fine particles include fine particles composed of silica, alumina, titania, zirconia, tin oxide, indium oxide, cadmium oxide, antimony oxide, and the like. Among these, the silica fine particles may be preferred. Particularly preferred resin fine particles having both the inorganic and organic properties may be silicone fine particles (e.g., Tospearl series available from Momentive Performance Materials Japan). One type of the fine particles may be used alone or two or more types may also be used in combination.

The above fine particles may be subjected to a desired surface modification. The shape of the fine particles may be a finite shape such as a spherical shape or may also be an indefinite shape in which the shape is not specified, but from the viewpoint of readily adjusting the difference between the maximum value and the minimum value of frictional force or the standard deviation of frictional force within the previously described corresponding range, the shape of the fine particles may be preferably a definite shape and particularly preferably a spherical shape.

The content of the fine particles in the coating composition may be preferably 0.05 mass parts or more, particularly preferably 0.1 mass part or more, and further preferably 0.2 mass parts or more with respect to 100 mass parts of the curable component. From another aspect, the content of the fine particles in the coating composition may be preferably 15 mass parts or less, particularly preferably 9 mass parts or less, and further preferably 5 mass parts or less with respect to 100 mass parts of the curable component. When the content of the fine particles falls within the above range, the difference between the maximum value and the minimum value of frictional force or the standard deviation of frictional force can be readily adjusted within the previously described corresponding range.

(2-3) Surface Conditioner

When the coating composition contains a surface conditioner, generation of streaky defects, unevenness, and the like can be suppressed in the writing feel improving layer 12 formed. This allows the film thickness to be uniform, and the writing feel improving sheet 1 can have a more excellent appearance and can readily have desired optical properties (such as the haze value and the total luminous transmittance). Moreover, the difference between the maximum value and the minimum value of frictional force or the standard deviation of frictional force can be readily adjusted within the previously described corresponding range because the surface of the writing feel improving layer 12 of the writing feel improving sheet 1 can readily have a good surface condition.

Examples of the surface conditioner include silicone-based, fluorine-based, acrylic-based, and vinyl-based surface conditioners. Among these, the silicone-based surface conditioner and the fluorine-based surface conditioner may be preferred from the viewpoint of the surface conditioning properties and the compatibility with other components. One type of the surface conditioner may be used alone or two or more types may also be used in combination.

The silicone-based surface conditioner may be preferably polydimethylsiloxane or modified polydimethylsiloxane and particularly preferably polydimethylsiloxane.

Preferred examples of the fluorine-based surface conditioner include a compound having a perfluoroalkyl group or a fluorinated alkenyl group in the main chain or a side chain. Examples of commercially available products include, but are not limited to, BYK-340 available from BYK Japan KK., Ftergent 650A available from NEOS COMPANY LIMITED, Megafac RS-75 available from DIC, and V-8FM available from OSAKA ORGANIC CHEMICAL INDUSTRY LTD.

The content of the surface conditioner in the coating composition may be preferably 0.01 mass parts or more, particularly preferably 0.1 mass parts or more, and further preferably 0.2 mass parts or more with respect to 100 mass parts of the curable component. From another aspect, the content of the surface conditioner in the coating composition may be preferably 2 mass parts or less, more preferably 1 mass part or less, particularly preferably 0.5 mass parts or less, and further preferably 0.3 mass parts or less with respect to 100 mass parts of the curable component. When the content of the surface conditioner falls within the above range, the appearance of the writing feel improving sheet 1 can be effectively improved. Moreover, the optical properties (such as the haze value and the total luminous transmittance) can be readily adjusted within the previously described ranges. Furthermore, in the writing feel improving layer 12, the difference between the maximum value and the minimum value of frictional force or the standard deviation of frictional force can be readily adjusted within the previously described corresponding range, and the dynamic friction coefficient of frictional force can also be readily adjusted within the previously described range.

(2-4) Silica Nanoparticles

When the coating composition contains silica nanoparticles, the hardness of the writing feel improving layer 12 formed can be effectively improved. Furthermore, the optical properties (such as the haze value and the total luminous transmittance) of the writing feel improving sheet 1 can be readily adjusted within the previously described ranges, and the occurrence of glare when using the writing feel improving sheet 1 can be effectively suppressed.

The average particle diameter of the silica nanoparticles may be preferably 1 nm or more, particularly preferably 5 nm or more, and further preferably 10 nm or more. From another aspect, the average particle diameter of the silica nanoparticles may be preferably 300 nm or less, particularly preferably 100 nm or less, and further preferably 50 nm or less. The average particle diameter of the silica nanoparticles is measured with a laser diffraction and scattering-type particle diameter distribution measurement device.

The silica nanoparticles may be modified with an organic substance for the purpose of improving the dispersibility and the like. The silica nanoparticles may also be preferably in the form of an organosol (colloidal form). When the silica nanoparticles are in the form of an organosol, the dispersibility of the silica nanoparticles may be satisfactory, and the homogeneity and light transmittance of the writing feel improving layer 12 formed may be improved.

Modification with an organic substance can be performed by an ordinary method. For example, surfaces of the silica nanoparticles can be modified through adding a silane coupling agent having a structure such as $CH_2=C(CH_3)COO(CH_2)_3Si(OCH_3)_3$ to an organosol of silica nanoparticles, heating them to about 50° C., and stirring for several hours. The structure and amount of the silane coupling agent to be used may be appropriately selected in accordance with the degree of requiring dispersibility of the silica nanoparticles.

Preferred examples of the dispersion solvent for the above organosol include methyl ethyl ketone and methyl isobutyl ketone, which are excellent in the compatibility with polyfunctional (meth)acrylate and a leveling agent and the volatility when forming the writing feel improving layer 12.

Commercially available products can be used as the above silica nanoparticles, among which organosilica sol MEK-ST and MIBK-ST available from Nissan Chemical Corporation and the like may be preferably used.

The content of the silica nanoparticles in the coating composition may be preferably 5 mass parts or more, particularly preferably 10 mass parts or more, and further preferably 15 mass parts or more with respect to 100 mass parts of the curable component. From another aspect, the content of the silica nanoparticles in the coating composition may be preferably 50 mass parts or less, particularly preferably 35 mass parts or less, and further preferably 25 mass parts or less with respect to 100 mass parts of the curable component. When the content of the silica nanoparticles is 5 mass parts or more, the hardness of the writing feel improving layer 12 formed can be more effectively improved, and the occurrence of glare can be more effectively suppressed. On the other hand, when the compounding ratio of the silica nanoparticles is 50 mass parts or less, cohesion of the silica nanoparticles can be suppressed, and the homogeneity and light transmittance of the writing feel improving layer 12 formed can be maintained well.

(2-5) Other Components

The coating composition in the present embodiment may contain various additives in addition to the above components. Examples of such additives include a photopolymerization initiator, an ultraviolet absorber, an antioxidant, a light stabilizer, an antistatic, a silane coupling agent, an antiaging agent, a thermal polymerization inhibitor, a colorant, a surfactant, a storage stabilizer, a plasticizer, a glidant, an antifoam, an organic-based filler, a wettability improving agent, and a coating surface improving agent.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, and p-dimethylaminobenzoic ester. These may each be used alone or two or more types may also be used in combination.

The content of the photopolymerization initiator in the coating composition may be preferably 1 mass part or more and particularly preferably 2 mass parts or more with respect to 100 mass parts of the curable component. From another aspect, the content of the photopolymerization initiator in the coating composition may be preferably 10 mass parts or less and particularly preferably 5 mass parts or less with respect to 100 mass parts of the curable component.

(2-6) Thickness

The thickness of the writing feel improving layer 12 may be preferably 0.8 μm or more, particularly preferably 1 μm or more, and further preferably 1.5 μm or more. From another aspect, the thickness of the writing feel improving layer 12 may be preferably 20 μm or less, particularly preferably 15 μm or less, and further preferably 10 μm or less. When the thickness of the writing feel improving layer 12 falls within the above range, the writing feel experienced when writing on paper with a ballpoint pen can be well reproduced.

(2-7) Haze Value

The haze value of the writing feel improving layer 12 may be preferably 22% or less, particularly preferably 16% or less, and further preferably 12% or less. When the haze value of the writing feel improving layer 12 is 22% or less, the haze value of the layer constituting the outermost surface of the writing feel improving sheet 1 is sufficiently reduced, and the occurrence of discoloration on the displayed image can thereby be effectively suppressed. On the other hand, from the viewpoint that the haze value of the writing feel improving sheet 1 can be readily adjusted within the previously described range, the haze value of the writing feel improving layer 12 may be preferably 0.01% or more, particularly preferably 0.1% or more, and further preferably 0.2% or more. The haze value of the writing feel improving layer 12 can be calculated by subtracting the have values of other layers (such as the base material 11 and an adhesive layer to be described late) constituting the writing feel improving sheet 1 from the haze value of the writing feel improving sheet 1.

(3) Other Members

The writing feel improving sheet 1 according to the present embodiment may further have one or more other layers, provided that the writing feel improving layer 12 is exposed at the outermost surface. For example, an adhesive layer may be formed on the surface of the base material 11 opposite to the writing feel improving layer 12 and a release sheet may be further laminated on the adhesive layer.

A product usually used for optical application can be used as an adhesive that constitutes the adhesive layer, and examples thereof include an acrylic-based pressure sensitive adhesive, a rubber-based pressure sensitive adhesive, a silicone-based pressure sensitive adhesive, a urethane-based pressure sensitive adhesive, a polyester-based pressure sensitive adhesive, and a polyvinyl ether-based pressure sensitive adhesive. Among these, the acrylic-based pressure sensitive adhesive may be preferred because it develops desired adhesive properties and is excellent in the optical properties and durability.

The adhesive layer may or may not contain the previously described fine particles. When the adhesive layer does not contain fine particles, the haze value of the adhesive layer is not particularly limited, but may be usually preferably 0% or more, particularly preferably 0.1% or more, and further preferably 0.2% or more. From another aspect, the haze value of the adhesive layer containing no fine particles may be preferably 30% or less, particularly preferably 10% or less, and further preferably 1% or less.

On the other hand, when the adhesive layer contains the previously described fine particles, the adhesive layer has a desired haze value, and accordingly the haze value of the writing feel improving sheet 1 can be readily adjusted within the above-described range. In this case, the haze value of the adhesive layer may be preferably 20% or more, particularly preferably 30% or more, and further preferably 50% or more. From another aspect, the haze value of the adhesive layer containing the fine particles may be preferably 95% or less, particularly preferably 90% or less, and further preferably 80% or less. The above haze value is measured in accordance with JIS K7136: 2000, and the detailed measuring method is as described in the testing example, which will be described later.

The thickness of the adhesive layer may be preferably 5 μm or more, particularly preferably 10 μm or more, and further preferably 20 μm or more. From another aspect, the thickness of the adhesive layer may be preferably 1000 μm or less, more preferably 500 μm or less, and particularly preferably 250 μm or less, but from the viewpoint of well reproducing the writing feel experienced when writing on paper with a ballpoint pen and the view point of reducing the total thickness of a touch panel provided with the writing feel improving sheet 1, the thickness of the adhesive layer may be preferably 100 μm or less, further preferably 50 μm or less, and most preferably 30 μm or less.

3. Production Method for Writing Feel Improving Sheet

The production method for the writing feel improving sheet 1 according to the present embodiment is not particularly limited, provided that the writing feel improving sheet 1 can achieve the previously described difference between the maximum value and the minimum value of frictional force or the previously described standard deviation of frictional force. For example, it may be preferred to produce the writing feel improving sheet 1 through coating the base material with a coating liquid that contains the previously described coating composition and, if desired, a solvent and curing the coating liquid to form the writing feel improving layer 12.

The solvent can be used for improvement of coating properties, adjustment of viscosity, adjustment of solid content concentration, and the like. Such a solvent can be used without particular limitation, provided that it dissolves curable components and the like and disperses fine particles and the like.

Specific examples of the solvent include alcohols such as methanol, ethanol, isopropanol, butanol, and octanol; ketones such as acetone, methyl ethyl ketone, methyl isobutyl ketone, and cyclohexanone; esters such as ethyl acetate, butyl acetate, ethyl lactate, and γ-butyrolactone; ethers such as ethylene glycol monomethyl ether (methyl cellosolve), ethylene glycol monoethyl ether (ethyl cellosolve), diethylene glycol monobutyl ether (butyl cellosolve), and propylene glycol monomethyl ether; aromatic hydrocarbons such as benzene, toluene, and xylene; and amides such as dimethylformamide, dimethylacetamide, and N-methylpyrrolidone.

The coating with the coating liquid of the coating composition may be performed using an ordinary method, such as a bar coating method, a knife coating method, a roll coating method, a blade coating method, a die coating method, or a gravure coating method. After the coating with the coating liquid of the coating composition, it may be preferred to dry the coating film at 40° C. to 120° C. for about 30 seconds to 5 minutes.

When the coating composition has active energy ray curability, the coating composition may be cured by irradiating the coating film of the coating composition with active energy rays such as ultraviolet rays and electron rays. Irradiation with ultraviolet rays can be performed using a high-pressure mercury lamp, a fusion H lamp, a xenon lamp, or the like, and the irradiance level of ultraviolet rays may be preferably about 50 to 1,000 $mW/cm^2$ as the illuminance and about 50 to 1,000 $mJ/cm^2$ as the light amount and particularly preferably about 100 to 500 $mW/cm^2$ as the illuminance and about 100 to 500 $mJ/cm^2$ as the light amount. On the other hand, irradiation with electron rays can be performed using an electron ray accelerator or the like, and the irradiance level of electron rays may be preferably about 10 to 1,000 krad.

4. Use of Writing Feel Improving Sheet

The writing feel improving sheet 1 according to the present embodiment can be used as a sheet that constitutes the outermost layer of a touch panel (image display device with position detection function) on which a touch pen is used. Specifically, the writing feel improving sheet may preferably be used by being laminated on the cover material of a display body module such as a liquid crystal (LCD) module, a light emitting diode (LED) module, or an organic electroluminescence (organic EL) module or the cover material of a touch panel having a touch sensor or the like. Lamination of the writing feel improving sheet 1 on the cover material may be preferably performed by attaching the writing feel improving sheet 1 to the cover material via the described adhesive layer as described previously.

The touch pen used for the writing feel improving sheet 1 according to the present embodiment is not particularly limited, and a conventionally known one can be used. As the touch pen, for example, a touch pen having a polyacetal pen tip, a touch pen having a hard felt pen tip, a touch pen having an elastomer pen tip, or the like can be used. The shape of the pen tip of the touch pen is not particularly limited, and can be appropriately selected from a disk shape, a circular shape, a polygonal shape, and the like, but from the viewpoint that the feeling of vibration when writing with a ballpoint pen can be obtained, a circular shape may be preferred. When the shape of the pen tip of a touch pen is a circular shape, the diameter of the pen tip may be preferably 0.1 mm or more, particularly preferably 0.2 mm or more, and further preferably 0.3 mm or more. From another aspect, the above diameter may be preferably 5 mm or less, particularly preferably 2 mm or less, and further preferably 1 mm or less.

In the writing feel improving sheet 1 according to the present embodiment, the previously described difference between the maximum value and the minimum value of frictional force falls within the previously described range, or the previously described standard deviation of frictional force falls within the previously described range, and the feeling of vibration when writing with a ballpoint pen can thereby be well reproduced. In a touch panel using the writing feel improving sheet 1 according to the present embodiment, therefore, the writing feel when writing on paper with a ballpoint pen can be well reproduced.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

For example, one or more other layers may be interposed between the base material 11 and the writing feel improving layer 12 in the writing feel improving sheet 1.

EXAMPLES

Hereinafter, the present invention will be described further specifically with reference to examples, etc., but the scope of the present invention is not limited to these examples, etc.

Production Example 1

The materials listed in Table 1 were mixed at the compositions listed in Table 2 to obtain coating compositions C1 to C12. The obtained coating compositions were diluted with propylene glycol monomethyl ether to obtain coating liquids of the coating compositions C1 to C12. Solid content concentrations of the obtained coating liquids are as listed in Table 2.

Production Example 2

The materials listed in Table 1 were mixed at the compositions listed in Table 3 to obtain adhesive compositions P1 to P5. The obtained adhesive compositions were diluted with toluene to prepare coating liquids (solid content concentration: 15%) of the adhesive compositions P1 to P5.

Example 1

(1) Formation of Writing Feel Improving Layer

One surface of a polyethylene terephthalate (PET) film having easy-adhesion layers on both surfaces (available from Toray Industries, Inc., product name "Lumirror U48," thickness: 125 μm) as the base material was coated with the coating liquid of the coating composition C1 obtained in Production Example 1 using a Meyer bar to form a coating film and the coating film was then dried by heating at 70° C. for 1 minute using an oven.

Then, in the atmospheric air, the above coating film was cured by being irradiated with ultraviolet rays under the following condition using an ultraviolet irradiation device (available from EYE GRAPHICS CO., LTD., product name "EYE GRANDAGE ECS-401GX") to form a writing feel improving layer having a thickness of 3 μm.

Ultraviolet Irradiation Condition

Light source: High-pressure mercury lamp
Lamp power: 2 kW
Conveyor speed: 4.23 m/min
Illuminance: 240 mW/cm$^2$
Light amount: 307 mJ/cm$^2$ (2) Formation of Adhesive Layer The release surface of a release sheet (available from LINTEC Corporation, product name "SP-PET381031") in which a silicone-based release agent layer was formed on one surface of a polyethylene terephthalate film having a thickness of 38 μm was coated with the coating liquid of the adhesive composition P1 obtained in Production Example 2 using an applicator to form a coating film. Subsequently, the above coating film was dried by heating at 90° C. for 2 minutes using an oven and aged under a condition of 23° C. and 50% RH for 7 days, and an adhesive layer having a thickness of 25 μm was formed on the release sheet.

When the haze value of the adhesive layer itself (thickness: 25 μm) obtained as above was measured by a method to be described later, the measured value was 0.3%.

(3) Formation of Writing Feel Improving Sheet

The surface on the base material side of the laminate of the base material and writing feel improving layer obtained in the above-described step (1) and the surface on the adhesive layer side of the laminate of the release sheet and the adhesive layer obtained in the above-described step (2) were attached to each other thereby to obtain a writing feel improving sheet in which the writing feel improving layer, the base material, the adhesive layer, and the release sheet were laminated in this order.

Examples 2 to 16 and Comparative Examples 1 to 5

Writing feel improving sheets were produced in the same manner as in Example 1 except that the type of the coating composition used, the thickness of the writing feel improving layer, and the type of the adhesive composition used were as listed in Table 4. As the type of the adhesive composition used was different, the haze values of the adhesive layers were as listed in Table 4.

Testing Example 1 (Measurement of Haze Value and Total Luminous Transmittance)

In the same manner as in Examples and Comparative Examples, a laminate of the release sheet and the adhesive layer (thickness: 25 μm) was obtained. The surface of the laminate on the adhesive layer side was attached to a glass plate (length: 70 mm, width: 150 mm, thickness: 1.2 mm). Subsequently, the release sheet was removed, and this was used as each sample for measurement. Then, after performing the background measurement on the glass plate alone, a haze meter (available from NIPPON DENSHOKU INDUSTRIES CO., LTD., product name "NDH-5000") was used for the above sample for measurement to measure the haze value (%) of the adhesive layer in accordance with JIS K7136: 2000. The results are listed in Table 4.

In addition, the release sheet was removed from the writing feel improving sheet produced in each of Examples and Comparative Examples, the exposed surface of the exposed adhesive layer was attached to a glass plate (length: 70 mm, width: 150 mm, thickness: 1.2 mm), and this was used as a sample for measurement. Then, after performing the background measurement on the glass plate alone, the haze meter (available from NIPPON DENSHOKU INDUSTRIES CO., LTD., product name "NDH-5000") was used for the sample for measurement to measure the haze value (%) of the writing feel improving sheet in accordance with JIS K7136: 2000 and measure the total luminous transmittance (%) of the writing feel improving sheet in accordance with JIS K7361-1: 1997. The results are listed in Table 4.

When the haze value (%) of the base material used for the production of the writing feel improving sheets according to Examples and Comparative Examples was measured using the haze meter (available from NIPPON DENSHOKU INDUSTRIES CO., LTD., product name "NDH-5000") in accordance with JIS K7136: 2000, the measured value was 0.8%.

Testing Example 2 (Measurement of Surface Roughness)

For the surface on the writing feel improving layer side of the writing feel improving sheet produced in each of Examples and Comparative Examples, the arithmetic average surface roughness (Ra) and the ten-point average surface roughness (Rzjis) were measured using a contact-type roughness meter (available from Mitutoyo Corporation, product name: "SV3000S4") in accordance with JIS B0601: 2013. The results are listed in Table 4.

Testing Example 3 (Friction Measurement)

(1) Measurement of Frictional Force

The release sheet was removed from the writing feel improving sheet produced in each of Examples and Comparative Examples, and the exposed surface of the exposed adhesive layer was attached to a glass plate (length: 70 mm, width: 150 mm, thickness: 1.2 mm). Then, the glass plate was set on a dedicated carriage for measurement of a static and dynamic friction tester (available from Trinity-Lab Inc., product name "Tribomaster TL201Ts") so that the surface to which the writing feel improving sheet was attached would be on the upper side. The above dedicated carriage for measurement is configured to reciprocally move in a predetermined direction while keeping the setting surface of the above glass plate horizontal as the above static and dynamic friction tester is used.

Subsequently, a touch pen was fixed to the above static and dynamic friction tester so that the pen tip came into contact with the surface of the writing feel improving layer. At that time, the touch pen was inclined and fixed so that the angle formed between the touch pen and the above surface was 45°. In addition, the tilting direction at that time was set parallel to the direction of the reciprocal movement of the dedicated carriage for measurement.

Touch pens listed in Table 4 were used as the above-described touch pen. Details of the simplified names in Table 4 are as follows.

POM: Touch pen having a polyacetal pen tip (available from Wacom Co., Ltd., product name "ACK-2001," pen tip diameter: 0.5 mm)

Felt: Touch pen having a hard felt pen tip (available from Wacom Co., Ltd., product name "ACK-2003," pen tip diameter: 0.5 mm)

Elastomer: Touch pen having an elastomer pen tip (available from Wacom Co., Ltd., product name "ACK-2004," pen tip diameter: 0.5 mm).

Subsequently, in a state in which a load was applied to the touch pen under a pressurization condition of the load of 200 g, the above-described dedicated carriage for measurement was moved at a speed of 1.6 mm/second thereby to slide the touch pen on the surface of the writing feel improving layer. Through this operation, the frictional force (mN) generated between the pen tip of the touch pen and the surface of the writing feel improving layer was measured. The direction of movement of the dedicated carriage for measurement was set to a direction in which an angle formed between the touch pen and the trajectory of the pen tip drawn on the surface of the writing feel improving layer due to the above sliding was 45° (i.e., a direction in which the pen tip of the touch pen slid so as to push forward on the surface of the writing feel improving layer). The measurement was continued until the sliding distance became 100 mm or more, and the measured value was acquired every 50 msec.

In the sequence of frictional force (mN) obtained as described above, the average value was calculated for the frictional force measured between a point at which the sliding distance was 10 mm and a point at which the sliding distance was 100 mm, and the maximum value and the minimum value were specified. These results are listed in Table 4. In addition, the difference in frictional force was calculated by subtracting the minimum value from the maximum value. The results are also listed in Table 4.

Furthermore, the standard deviation of frictional force was calculated for the frictional force measured between a point at which the sliding distance was 10 mm and a point at which the sliding distance was 20 mm. The results are listed in Table 4.

(2) Measurement of Dynamic Friction Coefficient

The dynamic friction coefficient was measured with the same measurement device and measurement condition as in the above step (1). Furthermore, the dynamic friction coefficient was measured with the same measurement device and measurement condition as in the above step (1) except that the moving speed of the dedicated carriage for measurement was 16.7 mm/second. These results are listed in Table 4.

(3) Measurement of Reference Example

As a reference, the frictional force and the dynamic friction coefficient when writing on paper with a ballpoint pen (Reference Example 1) and when writing on paper with a pencil (Reference Example 2) were measured in the same manner as in the above steps (1) and (2). These results are also listed in Table 4.

Details of the paper, ballpoint pen, and pencil used are as follows.

Paper: available from KOKUYO Co., Ltd., product name "Campus Loose Leaf," product model number: "NO-S816B," size: B5, ruled width: B-ruled, 20 sheets stacked when used Ballpoint pen: available from BIC, product name "Orange EG 1.0," oil-based ballpoint pen, pen tip diameter: 1.0 mm Pencil: available from MITSUBISHI PENCIL CO., LTD., product name "Uni," hardness of pencil lead: HB Testing Example 4 (Evaluation of Writing Feel)

The release sheet was removed from the writing feel improving sheet produced in each of Examples and Comparative Examples, and the exposed surface of the exposed adhesive layer was attached to a glass plate (length: 70 mm, width: 150 mm, thickness: 1.2 mm). For the surface of the writing feel improving layer, an evaluator evaluated the following items of the writing feel through a predetermined writing operation in a simulated manner using the same touch pen used in Testing Example 3. The results are listed in Table 4.

(1) Feeling of Vibration

Whether the feeling of vibration when writing on paper with a ballpoint pen was able to be reproduced was evaluated based on the following criteria.

A: The feeling of vibration was able to be reproduced very well.

B+: The feeling of vibration was slightly large, but was able to be well reproduced.

B−: The feeling of vibration was slightly small, but was able to be well reproduced.

C+: The feeling of vibration was unduly large and was not able to be well reproduced.

C−: The feeling of vibration was unduly small and was not able to be well reproduced.

(2) Feeling of Resistance

Whether the feeling of resistance (=degree of friction) when writing on paper with a ballpoint pen was able to be reproduced was evaluated based on the following criteria.

A: The feeling of resistance was able to be reproduced very well.

B+: The feeling of resistance was slightly large, but was able to be well reproduced.

B−: The feeling of resistance was slightly small, but was able to be well reproduced.

C+: The feeling of resistance was unduly large and was not able to be well reproduced.

C−: The feeling of resistance was unduly small and was not able to be well reproduced.

Testing Example 5 (Evaluation of Glare)

The release sheet was removed from the writing feel improving sheet produced in each of Examples and Comparative Examples, and the exposed surface of the exposed adhesive layer was attached to the surface of the display screen of a tablet terminal (available from Apple Inc., product name "iPad (registered trademark)," resolution: 264 ppi). After that, the presence or absence of glare was visually confirmed in a state in which the tablet terminal entirely displayed green (RGB values (R, G, B)=0, 255, 0). On the basis of the results, the glare was evaluated in accordance with the following criteria. The results are listed in Table 4.

A: Almost no glare was confirmed.

B: Some glare occurred, but the glare was to an extent of not causing any problem in practical use.

C: Significant glare occurred.

Testing Example 6 (Evaluation of Scratch Resistance)

The surface on the writing feel improving layer side (surface of the writing feel improving layer) of the writing feel improving sheet produced in each of Examples and Comparative Examples was rubbed at a load of 250 g/cm$^2$ using #0000 steel wool to reciprocate it ten times within a length of 10 cm. The surface of the writing feel improving layer was visually confirmed under a three-wavelength fluorescent lamp, and the scratch resistance was evaluated in accordance with the following criteria. The results are listed in Table 4.

A: No scratches were confirmed.

B: Several scratches were confirmed.

C: Scratches were confirmed on the entire surface.

Testing Example 7 (Evaluation of Discoloration)

The release sheet was removed from the writing feel improving sheet produced in each of Examples and Comparative Examples, and the exposed surface of the exposed adhesive layer was attached to the surface of the display screen of a tablet terminal (available from Apple Inc., product name "iPad (registered trademark)," resolution: 264 ppi). Then, the display screen of the tablet terminal was set to an entirely black display to visually confirm the presence or absence of discoloration, and the discoloration was evaluated in accordance with the following criteria. The results are listed in Table 4.

A: No discoloration was confirmed.

B: Discoloration was confirmed at a level of not causing any problem in practical use.

C: Discoloration was confirmed at a level of causing problems in practical use.

Testing Example 8 (Measurement of Surface Profile)

For the surface of the writing feel improving layer of the writing feel improving film produced in each of Examples 4, 6, and 14 to 16, an optical interference-type surface profile observation device (available from Veeco Instruments Inc., product name "WYKO-1100") was used in a vertical scanning interference measurement method (VSI mode) to acquire a plurality of observation images at a magnification of 50. Then, by joining the obtained plurality of observation images, an observation image having an observation area of 500 μm square was obtained. Among the observation images thus obtained, the observation image according to Example 4 is shown in FIG. 3, and the observation image according to Example 14 is shown in FIG. 4. In these figures, the obtained observation image is displayed so that the surface of the writing feel improving layer is looked down from diagonally above. In this testing example, regions having a height of 1.0 μm or less were defined as flat portions, and regions having a height exceeding 1.0 μm were defined as projecting portions.

Subsequently, the observation image of the 500 μm square observation area obtained as above was printed on copy paper. At that time, the observation image was printed so that the surface of the writing feel improving layer was viewed in a plane. Then, only the region in which the observation image of the 500 μm square observation area was printed was cut out from the printed copy paper, and the mass (g) of the copy paper on which the observation area was printed was measured (this mass is referred to as an "observation area mass"). Further, only the previously described flat portions (regions having a height of 1.0 μm or less) were cut out from the copy paper on which the observation area was printed, and the mass (g) of the copy paper fragments thus obtained and corresponding to the flat portions was measured (this mass is referred to as a "flat portion mass"). Then, the ratio (%) of the flat portions on the surface of the writing feel improving layer was calculated by the following formula. The results are listed in Table 4.

(Ratio of flat portions)=(Flat portion mass)/(Observation area mass)×100

In addition, in a state in which the observation image of the 500 μm square observation area obtained as above was displayed so that the surface of the writing feel improving layer was viewed in a plane, inscribed circles of the flat portions (perfect circles existing in the flat portions, circumscribed by projecting portions, and not including the projecting portions) were assumed, and the inscribed circle having the largest radius among those inscribed circles was specified. The maximum radii (μm) of the inscribed circles of the flat portions thus specified are listed in Table 4.

Further, the number of projections was counted in the observation image of the 500 μm square observation area obtained as above. At that time, the number of projections having a height of more than 1 μm and 5 μm or less and the number of projections having a height of more than 5 μm were counted separately. The results are listed in Table 4.

Testing Example 9 (Measurement of Pen Tip Wear Amount)

The release sheet was removed from the writing feel improving sheet produced in each of Example 4 and Example 15, and the exposed surface of the exposed adhesive layer was attached to a glass plate (length: 70 mm, width: 150 mm, thickness: 1.2 mm). Then, the glass plate was set on a durability tester (available from Touch Panel Laboratories Co., Ltd.) so that the surface to which the writing feel improving sheet was attached would be on the upper side.

Subsequently, a touch pen was fixed to the above durability tester so that the pen tip came into contact with the surface of the writing feel improving layer. At that time, the touch pen was fixed so that the angle formed between the touch pen and the above surface was 90°. A touch pen having a hard felt pen tip (available from Wacom Co., Ltd., product name "ACK-2003," pen tip diameter: 0.5 mm) was used as the touch pen. The length of the pen tip of the touch pen was measured and recorded before being fixed to the durability tester.

After that, the touch pen was moved on the surface of the writing feel improving layer at a speed of 100 mm/second in a state in which a load was applied to the touch pen under a pressure condition of the load of 300 g. At that time, the touch pen was moved so as to sequentially trace the four sides of a square having a side of 10 mm on the surface of the writing feel improving layer. Then, when the tracing the square 50,000 times was completed, the durability tester was stopped.

Subsequently, the touch pen after the test was released from the durability tester, and the length of the pen tip was measured. Then, the length of the pen tip after the test was subtracted from the length of the pen tip before the test recorded as described above, and the amount of wear (mm) of the pen tip was calculated. As a result, the amount of wear of the pen tip in Example 4 was 0.8 mm, and the amount of wear of the pen tip in Example 15 was 1.8 mm.

TABLE 1

| Name of material | Sign | Details of material |
|---|---|---|
| Curable component | a | Pentaerythritol hexaacrylate |
| | b | Polyfunctional urethane acrylate |
| Silica nanoparticles | c | Silica fine particles of average diameter of 10 nm (surface modified) |
| Fine particles | d | Material: Silicone, Shape: Spherical, Average particle diameter: 4.5 μm, Coefficient of variation of particle diameter: 24% |
| | e | Material: Silicone, Shape: Spherical, Average particle diameter: 11.0 μm, Coefficient of variation of particle diameter: 10% |
| | f | Material: Silica, Shape: Indefinite, Average particle diameter: 1.5 μm, Coefficient of variation of particle diameter: 83% |
| | g | Material: Silica, Shape: Indefinite, Average particle diameter: 7.6 μm, Coefficient of variation of particle diameter: 30% |
| | n | Material: Acrylic resin, Shape: Exactly spherical, Average particle diameter: 20 μm, Coefficient of variation of particle diameter: 11% |
| Surface conditioner | h | Reactive fluorine oligomer |
| | i | Acrylic modified polydimethylsiloxane |
| | j | Polyester modified polydimethylsiloxane |
| Photo-polymerization initiator | k | α-hydroxyphenylketone |
| Acrylic-based polymer | l | Monomer composition; Butyl acrylate/Acrylic acid = 95/5 [mass parts], Weight-average molecular weight: 1,500,000 |
| Crosslinker | m | 1,3-bis(N,N-diglycidylaminomethyl)cyclohexane |

TABLE 2

| Coating composition | Composition of coating composition | | | | | | Solid content concentration (%) |
|---|---|---|---|---|---|---|---|
| | Curable component | Silica nanoparticles | Fine particles | Surface conditioner | Photopolymerization initiator | Compounding ratio (mass parts) | |
| C1 | a | c | d | h | k | a/c/d/h/k = 80.9/16.2/0.2/0.2/2.4 | 15 |
| C2 | a | c | d | h | k | a/c/d/h/k = 79.2/15.8/2.4/0.2/2.4 | 15 |
| C3 | a + b | c | e | h | k | a/b/c/e/h/k = 40.5/40.5/16.2/0.2/0.2/2.4 | 40 |
| C4 | a + b | c | e | h | k | a/b/c/e/h/k = 39.6/39.6/15.8/2.4/0.2/2.4 | 40 |
| C5 | b | c | d | i | k | b/c/d/i/k = 77.3/15.5/4.6/0.3/2.3 | 15 |
| C6 | b | c | d | h | k | b/c/d/h/k = 75.6/15.1/6.8/0.3/2.3 | 15 |
| C7 | b | c | d | i | k | b/c/d/i/k = 73.9/14.8/8.9/0.3/2.2 | 15 |
| C8 | a | — | — | h | k | a/h/k = 96.9/0.1/2.9 | 30 |
| C9 | a | — | — | i | k | a/i/k = 96.9/0.1/2.9 | 30 |
| C10 | a + b | c | f | j | k | a/b/c/f/j/k = 32.3/32.3/21.3/11.6/0.5/1.9 | 30 |
| C11 | a | — | g | j | k | a/g/j/k = 88.4/8.8/0.1/2.7 | 15 |
| C12 | b | — | n | h + j | k | b/n/h/j/k = 91.3/5.5/0.2/0.3/2.7 | 50 |

TABLE 3

| Adhesive composition | Acrylic-based polymer | Fine particles | Cross-linker | Compounding ratio (mass parts) |
|---|---|---|---|---|
| P1 | l | — | m | l/m = 99.8/0.2 |
| P2 | l | d | m | l/d/m = 95.1/4.8/0.2 |
| P3 | l | d | m | l/d/m = 92.4/7.4/0.2 |
| P4 | l | d | m | l/d/m = 90.7/9.1/0.2 |
| P5 | l | d | m | l/d/m = 85.0/14.9/0.2 |

TABLE 3-continued

| | Writing feel improving layer | | Adhesive layer | Writing feel improving sheet | | | | Friction measurement | | | | | |
|---|---|---|---|---|---|---|---|---|---|---|---|---|---|
| | Coating composition | Thickness (μm) | Adhesive composition | Haze value (%) | Total Haze value (%) | luminous transmittance (%) | Surface roughness Ra | Surface roughness Rzjis | Touch pen | Frictional force (mN) Average value | Maximum value | Minimum value | Difference in frictional force | Standard deviation |
| Example 1 | C1 | 3 | P1 | 0.3 | 2.0 | 90.5 | 0.16 | 2.43 | POM | 475 | 580 | 376 | 204 | 39 |
| Example 2 | C2 | 2 | P1 | 0.3 | 18.5 | 90.5 | 0.51 | 4.51 | POM | 670 | 745 | 613 | 132 | 26 |
| Example 3 | C3 | 8 | P1 | 0.3 | 1.5 | 90.5 | 0.07 | 2.62 | POM | 517 | 568 | 455 | 113 | 26 |
| Example 4 | C4 | 5 | P1 | 0.3 | 9.0 | 89.4 | 0.45 | 6.44 | Felt | 465 | 583 | 321 | 262 | 45 |
| Example 5 | C1 | 3 | P1 | 0.3 | 2.0 | 90.5 | 0.16 | 2.43 | Elastomer | 568 | 635 | 513 | 122 | 19 |
| Example 6 | C4 | 5 | P1 | 0.3 | 9.0 | 90.5 | 0.45 | 6.44 | POM | 1039 | 1093 | 977 | 116 | 27 |
| Example 7 | C1 | 3 | P2 | 31.2 | 35.4 | 89.8 | 0.16 | 2.43 | POM | 480 | 575 | 374 | 201 | 40 |
| Example 8 | C1 | 3 | P3 | 45.9 | 48.7 | 89.7 | 0.16 | 2.43 | POM | 477 | 574 | 354 | 220 | 37 |
| Example 9 | C1 | 3 | P4 | 59.3 | 60.3 | 89.5 | 0.16 | 2.43 | POM | 481 | 591 | 356 | 235 | 38 |
| Example 10 | C1 | 3 | P5 | 78.6 | 80.4 | 89.2 | 0.16 | 2.43 | POM | 474 | 598 | 369 | 229 | 37 |
| Example 11 | C5 | 3 | P1 | 0.3 | 29.2 | 88.7 | 0.81 | 2.58 | POM | 395 | 452 | 331 | 121 | 22 |
| Example 12 | C6 | 3 | P1 | 0.3 | 36.2 | 88.9 | 0.72 | 2.84 | POM | 415 | 491 | 373 | 118 | 17 |
| Example 13 | C7 | 3 | P1 | 0.3 | 50.7 | 89.3 | 0.80 | 2.80 | POM | 412 | 468 | 354 | 114 | 15 |
| Example 14 | C12 | 12 | P1 | 0.3 | 24.3 | 88.9 | 0.79 | 8.55 | POM | 417 | 519 | 331 | 188 | 41 |
| Example 15 | C12 | 12 | P1 | 0.3 | 24.3 | 88.9 | 0.79 | 8.55 | Felt | 459 | 520 | 409 | 112 | 20 |
| Example 16 | C12 | 12 | P1 | 0.3 | 24.3 | 88.9 | 0.79 | 8.55 | Elastomer | 952 | 1000 | 913 | 92 | 19 |
| Comparative Example 1 | C8 | 5 | P1 | 0.3 | 0.1 | 90.8 | 0.01 | 0.05 | POM | 188 | 205 | 163 | 42 | 9 |
| Comparative Example 2 | C9 | 5 | P1 | 0.3 | 0.1 | 90.8 | 0.01 | 0.04 | Elastomer | 530 | 580 | 501 | 59 | 10 |
| Comparative Example 3 | C10 | 4 | P1 | 0.3 | 20.6 | 89.4 | 0.15 | 1.35 | POM | 228 | 251 | 207 | 44 | 12 |
| Comparative Example 4 | C11 | 2 | P1 | 0.3 | 54.5 | 88.1 | 0.51 | 4.93 | POM | 661 | 695 | 623 | 72 | 14 |
| Comparative Example 5 | C4 | 3 | P1 | 0.3 | 20.3 | 88.4 | 0.62 | 7.62 | POM | 451 | 621 | 298 | 323 | 65 |
| Reference Example 1 | — | — | — | — | — | — | — | — | — | 548 | 630 | 479 | 151 | 30 |
| Reference Example 2 | — | — | — | — | — | — | — | — | — | 568 | 620 | 517 | 103 | 21 |

| | Friction measurement Dynamic friction coefficient | | Evaluation of write feeling | | Evaluation of glare | Evaluation of scratch resistance | Evaluation of discoloration | Surface profile | | Number of projections (counts) | |
|---|---|---|---|---|---|---|---|---|---|---|---|
| | Speed 1.6 mm/s | Speed 16.7 mm/s | Feel of vibration | Feel of resistance | | | | Ratio of flat portions (%) | Maximum radius of inscribed circle in flat portion (μm) | More than 1 μm and 5 μm or less | More than 5 μm |
| Example 1 | 0.26 | 0.28 | A | A | C | A | A | — | — | — | — |
| Example 2 | 0.31 | 0.32 | A | A | C | A | B | — | — | — | — |
| Example 3 | 0.27 | 0.28 | A | A | C | A | A | — | — | — | — |
| Example 4 | 0.24 | 0.25 | A | A | C | A | A | 6.8 | 34 | 98 | 0 |
| Example 5 | 0.27 | 0.32 | B− | A | C | A | A | — | — | — | — |
| Example 6 | 0.53 | 0.57 | A | C+ | C | A | A | 6.8 | 34 | 98 | 0 |
| Example 7 | 0.26 | 0.28 | A | A | B | A | A | — | — | — | — |
| Example 8 | 0.26 | 0.28 | A | A | B | A | A | — | — | — | — |
| Example 9 | 0.26 | 0.28 | A | A | A | A | A | — | — | — | — |
| Example 10 | 0.26 | 0.28 | A | A | A | A | A | — | — | — | — |

-continued

| | | | | | | | | | | | |
|---|---|---|---|---|---|---|---|---|---|---|---|
| Example 11 | 0.20 | 0.21 | B– | A | B | A | C | — | — | — | — |
| Example 12 | 0.21 | 0.21 | B– | A | B | A | C | — | — | — | — |
| Example 13 | 0.21 | 0.23 | B– | A | A | A | C | — | — | — | — |
| Example 14 | 0.23 | 0.23 | B+ | A | C | A | C | 28.5 | 66 | 206 | 19 |
| Example 15 | 0.25 | 0.27 | B– | A | C | A | C | 28.5 | 66 | 206 | 19 |
| Example 16 | 0.48 | 0.50 | B– | C+ | C | A | C | 28.5 | 66 | 206 | 19 |
| Comparative Example 1 | 0.09 | 0.10 | C– | C– | A | A | A | — | — | — | — |
| Comparative Example 2 | 0.27 | 0.51 | C– | A | A | A | A | — | — | — | — |
| Comparative Example 3 | 0.13 | 0.15 | C– | B– | C | A | B | — | — | — | — |
| Comparative Example 4 | 0.34 | 0.35 | C– | A | A | A | C | — | — | — | — |
| Comparative Example 5 | 0.23 | 0.26 | C+ | A | C | A | B | — | — | — | — |
| Reference Example 1 | 0.27 | 0.30 | — | — | — | — | — | — | — | — | — |
| Reference Example 2 | 0.29 | 0.30 | — | — | — | — | — | — | — | — | — |

As apparent from Table 4, the writing feel improving sheets produced in Examples are excellent in the writing feel with a touch pen and also excellent in the scratch resistance. Furthermore, in some of the writing feel improving sheets produced in Examples, the occurrence of glare is suppressed.

INDUSTRIAL APPLICABILITY

The writing feel improving sheet of the present invention may be preferably used as the outermost layer of a touch panel on which a touch pen is used.

DESCRIPTION OF REFERENCE NUMERALS 1 writing feel improving sheet
11 Base material
12 Writing feel improving layer

The invention claimed is:

1. A writing feel improving sheet comprising a base material and a writing feel improving layer with which a touch pen is brought into contact,
    wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a difference between a maximum value and a minimum value of frictional force generated between the pen tip and the surface is 80 mN or more and 300 mN or less such that a feeling of vibration of writing on paper with a ballpoint pen is obtained,
    wherein the frictional force is measured between a point at which a sliding distance is 10 mm and a point at which the sliding distance is 100 mm, and
    wherein a ratio of flat portions on a surface of the writing feel improving sheet on a writing feel improving layer side, which are regions in which a height is 1.0 μm or less, is 40% or less.

2. The writing feel improving sheet according to claim 1, wherein an average value of the frictional force generated between the touch pen and the surface is 200 mN or more and 1200 mN or less, wherein the frictional force is measured between a point at which the sliding distance is 10 mm and a point at which the sliding distance is 100 mm.

3. The writing feel improving sheet according to claim 2, comprising an adhesive layer provided on a surface side of the base material opposite to the writing feel improving layer.

4. The writing feel improving sheet according to claim 3, wherein a haze value of the writing feel improving sheet is 25% or more.

5. The writing feel improving sheet according to claim 2, wherein a haze value of the writing feel improving sheet is 25% or more.

6. The writing feel improving sheet according to claim 1, comprising an adhesive layer provided on a surface side of the base material opposite to the writing feel improving layer.

7. The writing feel improving sheet according to claim 6, wherein a haze value of the writing feel improving sheet is 25% or more.

8. The writing feel improving sheet according to claim 1, wherein a haze value of the writing feel improving sheet is 25% or more.

9. A writing feel improving sheet comprising a base material and a writing feel improving layer with which a touch pen is brought into contact,
    wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a standard deviation of frictional force generated between the pen tip and the surface is 15 mN or more and 60 mN or less such that a feeling of vibration of writing on paper with a ballpoint pen is obtained,
    wherein the frictional force is measured between a point at which a sliding distance is 10 mm and a point at which the sliding distance is 20 mm, and
    wherein a ratio of flat portions on a surface of the writing feel improving sheet on a writing feel improving layer side, which are regions in which a height is 1.0 μm or less, is 40% or less.

10. The writing feel improving sheet according to claim 9, wherein an average value of the frictional force generated between the touch pen and the surface is 200 mN or more and 1200 mN or less, wherein the frictional force is measured between a point at which the sliding distance is 10 mm and a point at which the sliding distance is 100 mm.

11. The writing feel improving sheet according to claim 10, comprising an adhesive layer provided on a surface side of the base material opposite to the writing feel improving layer.

12. The writing feel improving sheet according to claim 11, wherein a haze value of the writing feel improving sheet is 25% or more.

13. The writing feel improving sheet according to claim 10, wherein a haze value of the writing feel improving sheet is 25% or more.

14. The writing feel improving sheet according to claim 9, comprising an adhesive layer provided on a surface side of the base material opposite to the writing feel improving layer.

15. The writing feel improving sheet according to claim 14, wherein a haze value of the writing feel improving sheet is 25% or more.

16. The writing feel improving sheet according to claim 9, wherein a haze value of the writing feel improving sheet is 25% or more.

17. A writing feel improving sheet comprising a base material and a writing feel improving layer with which a touch pen is brought into contact,
wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a difference between a maximum value and a minimum value of frictional force generated between the pen tip and the surface is 80 mN or more and 300 mN or less such that a feeling of vibration of writing on paper with a ballpoint pen is obtained,
wherein the frictional force is measured between a point at which a sliding distance is 10 mm and a point at which the sliding distance is 100 mm,
wherein a surface of the writing feel improving sheet on a writing feel improving layer side has a plurality of flat portions,
wherein an inscribed circle may be provided in each of the plurality of flat portions, and
wherein a maximum radius of each of the inscribed circles is 100 μm or less and 10 μm or more.

18. A writing feel improving sheet comprising a base material and a writing feel improving layer with which a touch pen is brought into contact,
wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a standard deviation of frictional force generated between the pen tip and the surface is 15 mN or more and 60 mN or less such that a feeling of vibration of writing on paper with a ballpoint pen is obtained,
wherein the frictional force is measured between a point at which a sliding distance is 10 mm and a point at which the sliding distance is 20 mm,
wherein a surface of the writing feel improving sheet on a writing feel improving layer side has a plurality of flat portions,
wherein an inscribed circle may be provided in each of the plurality of flat portions, and
wherein a maximum radius of each of the inscribed circles is 100 μm or less and 10 μm or more.

19. A writing feel improving sheet comprising a base material and a writing feel improving layer with which a touch pen is brought into contact,
wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a difference between a maximum value and a minimum value of frictional force generated between the pen tip and the surface is 80 mN or more and 300 mN or less such that a feeling of vibration of writing on paper with a ballpoint pen is obtained,
wherein the frictional force is measured between a point at which a sliding distance is 10 mm and a point at which the sliding distance is 100 mm, and
wherein a number of projections having a height of more than 1 μm and less than 5 μm on a surface of the writing feel improving sheet on a writing feel improving layer side is 300 or less and 10 or more.

20. A writing feel improving sheet comprising a base material and a writing feel improving layer with which a touch pen is brought into contact,
wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a standard deviation of frictional force generated between the pen tip and the surface is 15 mN or more and 60 mN or less such that a feeling of vibration of writing on paper with a ballpoint pen is obtained,
wherein the frictional force is measured between a point at which a sliding distance is 10 mm and a point at which the sliding distance is 20 mm, and
wherein a number of projections having a height of more than 1 μm and less than 5 μm on a surface of the writing feel improving sheet on a writing feel improving layer side is 300 or less and 10 or more.

21. A writing feel improving sheet comprising a base material and a writing feel improving layer with which a touch pen is brought into contact,
wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a difference between a maximum value and a minimum value of frictional force generated between the pen tip and the surface is 80 mN or more and 300 mN or less such that a feeling of vibration of writing on paper with a ballpoint pen is obtained, wherein the frictional force is measured between a point at which a sliding distance is 10 mm and a point at which the sliding distance is 100 mm, and wherein a number of projections having a height of more than 5 μm on a surface of the writing feel improving sheet on a writing feel improving layer side is 30 or less.

22. A writing feel improving sheet comprising a base material and a writing feel improving layer with which a touch pen is brought into contact, wherein in a state that a touch pen having a pen tip of 0.5 mm diameter brings the pen tip into contact with a surface of the writing feel improving layer and the touch pen is then linearly slid at a speed of 1.6 mm/second while applying a load of 200 g to the touch pen and maintaining an angle formed between the touch pen and the surface at 45°, a standard deviation of frictional force generated between the pen tip and the surface is 15 mN or more and 60 mN or less such that a feeling of vibration of writing on paper with a ballpoint pen is obtained, wherein the frictional force is measured between a point at which a sliding distance is 10 mm and a point at which the sliding distance is 20 mm, and wherein a number of projections having a height of more than 5 μm on a surface of the writing feel improving sheet on a writing feel improving layer side is 30 or less.

* * * * *